(No Model.) 2 Sheets—Sheet 1.
F. KOPPLIN & P. BRENNAN.
VEHICLE RUNNING GEAR.
No. 389,968. Patented Sept. 25, 1888.
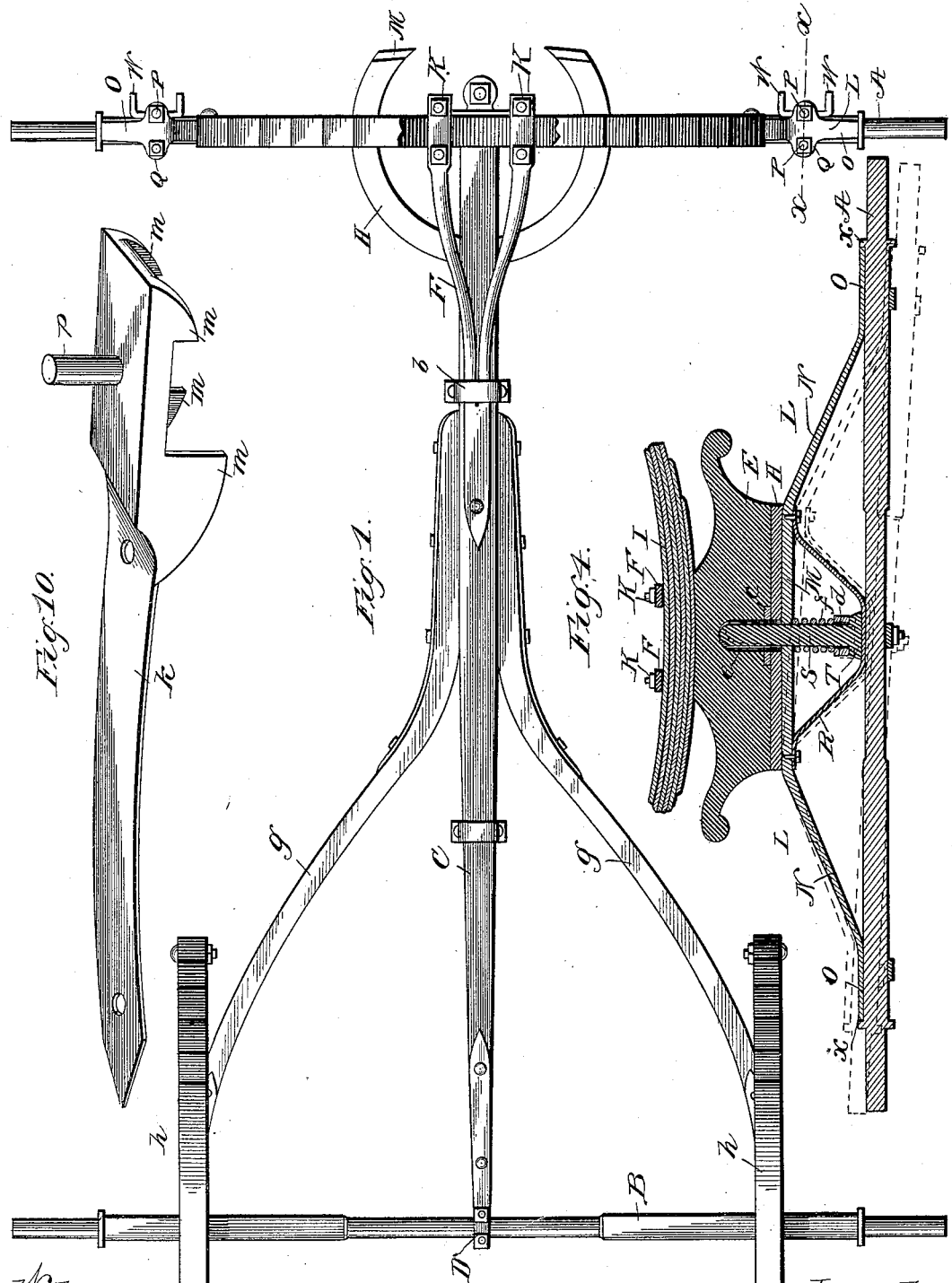

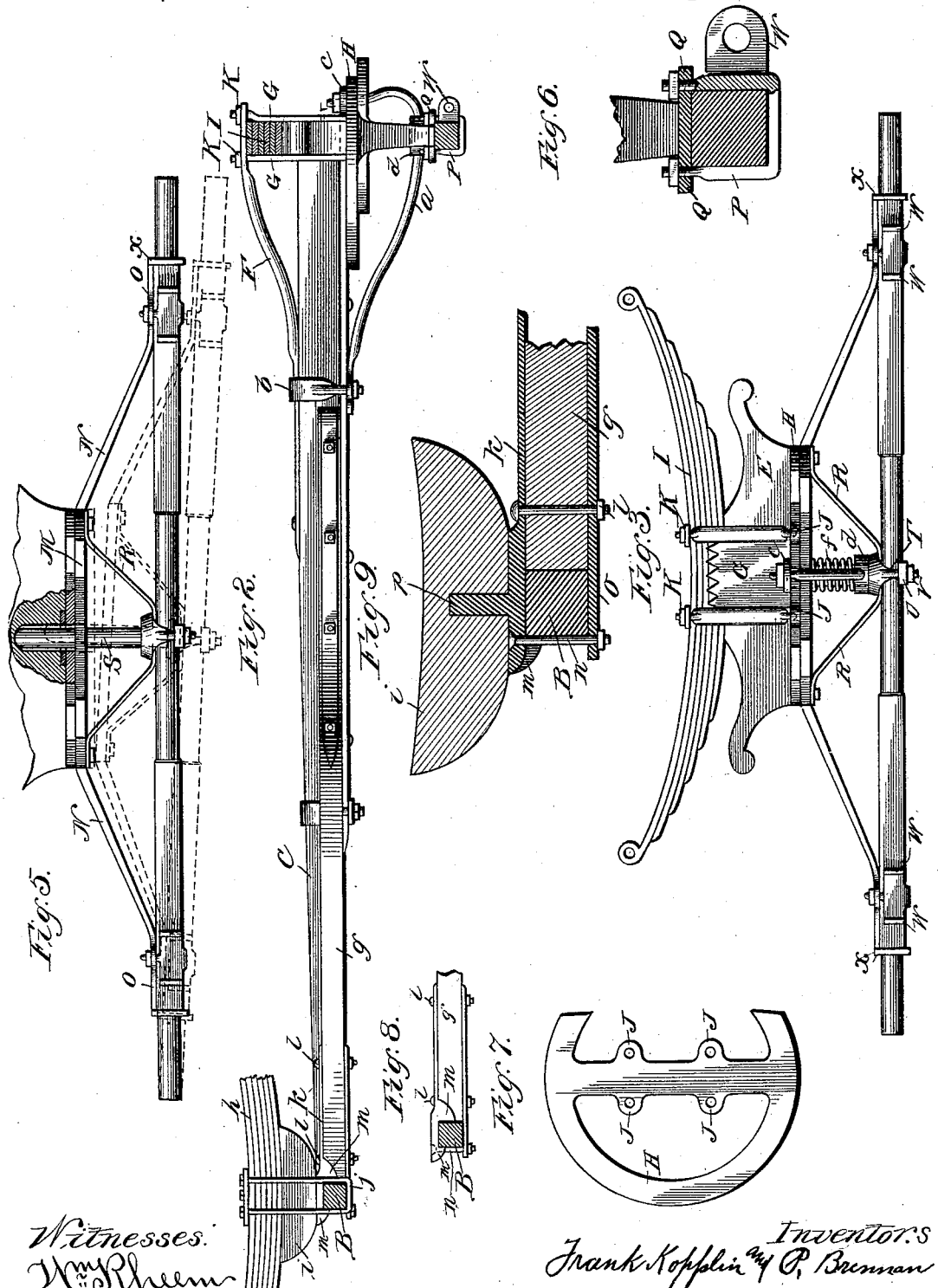

United States Patent Office.

FRANK KOPPLIN AND PATRICK BRENNAN, OF CHICAGO, ILLINOIS.

VEHICLE RUNNING-GEAR.

SPECIFICATION forming part of Letters Patent No. 389,968, dated September 25, 1888.

Application filed October 31, 1887. Serial No. 253,938. (No model.)

*To all whom it may concern:*

Be it known that we, FRANK KOPPLIN and PATRICK BRENNAN, both citizens of the United States, residing in Chicago, county of Cook, and State of Illinois, have invented certain new and useful Improvements in Vehicle Running-Gear, of which the following is a specification.

This invention relates to improvements in vehicle running-gear, in which, prior to our invention, there has been a rigid connection between the axle and vehicle-body so far as relates to a movement of the axle vertically away from and independent of the body of the vehicle, and as a result of such rigid connection the entire vehicle is subjected to damaging torsional strains whenever running upon any other than perfectly smooth ground, and this strain is centered upon the king-bolt connection between the body and front axle of the vehicle, necessarily the weakest part of the vehicle because of the necessity for such pivot-connection in all fifth-wheel devices. Another objection to the old form of connection between the front axle and body of a vehicle is the centering of the weight midway the length of the axle, frequently resulting in a broken axle by a less weight than is really required to fracture the same under ordinary circumstances.

The prime object of this invention is to relieve the king-bolt and head-block, and consequently the entire vehicle-body, of lateral strains due to unevenness of the ground upon which the vehicle is traveling and thereby promote the durability of the vehicle as a whole and avoid the liability of fracturing the king-bolt or any of its connections.

Another object is to avoid the centering of the weight midway the length of the front axle by distributing the same from end to end thereof.

A further object is to materially increase the strength of the running-gear and at the same time reduce the cost of construction by connecting the hounds with the rear axle at a point immediately underlying the springs, whereby the spread of the hounds is materially increased and a number of the parts heretofore employed for making the connection dispensed with.

A further object is to relieve the king-bolt and vehicle body of lateral and twisting strains tending to fracture the bolt and other connections by providing a yielding connection between the axle and vehicle-body, whereby the sudden dropping of a wheel into a depression is compensated for by the axle and wheel taking up all the movement while the body remains substantially at the same elevation, thereby rendering the vehicle more easy-riding than any other in which a rigid connection is made between the body and axle.

Further objects are to so construct the fifth-wheel and mechanisms connecting the two parts thereof, respectively, to the vehicle-axle and body that said parts may be slightly separated from one another, but not disconnected, whereby the axle may have a vertical movement away from and independent of the body, and to provide improved means for coupling the hounds and springs to the rear axle, and to provide certain details of construction in the carrying out of our invention, all as illustrated in the accompanying drawings, in which—

Figure 1 represents a plan view of vehicle running-gear embodying our invention; Fig. 2, a side elevation thereof; Fig. 3, a front elevation of the same; Fig. 4, a central longitudinal section through the front-axle, head-block, and connecting mechanism; Fig. 5, a detail front elevation of the axle and truss-frame, the dotted lines showing the movement which takes place when one wheel runs into a depression; Fig. 6, an enlarged detail section through the front axle on the line *x x*, Fig. 1; Fig. 7, a detail view of the upper part of the fifth-wheel; Fig. 8, a detail section through the rear axle, showing in side elevation the coupling-iron employed for joining the hounds to the axle; Fig. 9, a similar view showing the hound, coupling-iron, and spring-blocks in section; Fig. 10, a detail perspective of the hound coupling-iron.

Similar letters of reference indicate the same parts in the several figures of the drawings.

Referring by letter to the accompanying drawings, A B respectively indicate the usual front and rear metallic axles of the running-gear, and C the reach, which is coupled at its rear end to the rear axle by means of an ordinary clip, D, and at its front end is mortised into a head-block, E, with which it is firmly united by the bifurcated reach-iron F, and the clip G encompassing said block. This clip also serves to rigidly secure to said head-block the upper part or circle, H, of the fifth-wheel, and also the springs I, by means of the bolts thereof, the heads of which engage lugs J, formed upon said upper plate, H, their opposite ends projecting through the ends of the bifurcated reach-iron F on top of the springs, where they are tightened and secured by nuts K, thus firmly uniting the reach, head-block, front springs, and upper part of the fifth-wheel by one and the same clip.

The head-block, or, rather, the upper part of the fifth-wheel secured thereto, rests and works upon a truss-frame, which in turn is secured to the axle, said frame consisting of the angular truss-iron L, having a horizontal central portion, M, (constituting the under circle or base of the fifth-wheel,) two downwardly-inclined portions, N, on each side thereof, and two straight end portions, O, resting upon the axle A, to which it is secured by means of U-bolts P, passing beneath the axle and up through ears or lugs Q, formed upon said ends.

Secured to the under side of the horizontal portion M of the truss-iron, at the sides thereof, are the ends of a brace-rod, R, the central portion of which inclines downwardly until it rests upon the axle, at which point it is rigidly held by the head of the king-bolt T, which, instead of passing through the axles, rests upon said brace rod, so as to bind it firmly against the axle, the said bolt, however, being rigidly secured to the axle by having depending bolts U formed upon the head thereof and passing down at each side of the axle through a clip-plate, V, on the under side thereof, upon the ends of which bolts are screwed nuts W, as usual in clips.

The ends O of the truss-iron L are designed to bear against the shoulders X, usually formed upon axles near the ends thereof, thus providing for said truss-frame a triple support against a vertical strain, such as the weight of a load—namely, at the center and ends of the axle—thus preventing a centering of the weight about midway the length thereof, as occurs in the prior constructions, the weight in this case being distributed the entire length of the axle.

The end bracing of the truss-iron against the shoulders supplements the brace-rod in resisting the tendency of the weight of a load to flatten or break down the said frame, and at the same time serves to relieve the end clips thereof from a severe lateral strain, which otherwise materially reduces the durability of such a construction as a whole.

The same clip, P, which secures the ends of the truss-iron to the axle has lugs or ears W formed thereon, thus constituting the draw-clip or coupling for the thills, and by reason of its being secured to said iron is absolutely prevented from an endwise shifting upon the axle and consequent rattling, which cannot be the case with the old form, in which the clip merely encompasses the axle and wooden bolster thereof. In such constructions the shrinking of the wood or loosening of the nuts immediately produces a disagreeable rattling of the parts.

For the purpose of connecting the axle to the head-block, a stirrup, $a$, is employed, secured at its rear end to the reach by means of a clip, $b$, and at its forward end to an iron strap, $c$, fastened to the under side of the reach for strengthening the same, the forward end of which projects under and slightly beyond the head-block, where it is engaged by the said stirrup. In this stirrup, immediately underlying the center of the head-block, is formed an eye, $d$, through which freely passes the king-bolt S, the head of which abuts against the under side of the said eye, and the upper free end of which projects loosely into a socket-hole, $e$, formed in the head-block, so as to permit a lateral movement of said bolt therein.

Sleeved upon the king-bolt, and confined between the eye $d$ and the under side of the horizontal portion or lower circle, M, of the truss-iron, is a stout coil spring, $f$, which, while it permits a movement of the axle and truss-frame independent of the head-block and other stationary portions of the running-gear, at the same time serves both to limit said movement and to prevent the entire separation or disconnection of the parts. With such a flexible connection between the axle and head-block or equivalent portion of the stationary running-gear, it is obvious that not only is the king-bolt relieved from lateral strains tending to fracture it, but the entire running-gear is relieved of torsional strains, which, as in the prior construction, soon loosen up and wear upon the parts to a degree rendering constant repair necessary. Further than this, great comfort results to the occupants of a vehicle provided with such a flexible connection, for, instead of the vehicle lurching and rocking at every depression in which the wheel drops, the wheel and one end of the axle alone will descend, the remainder of the running-gear and body of the vehicle retaining substantially its same relative position to the ground, as clearly illustrated by dotted lines in Figs. 4 and 5, in the latter of which the wheels are supposed to have simultaneously struck a depression on one side and an elevation on the other. In either case it is apparent that the outside edge of the lower part or circle of the fifth-wheel—that is, the horizontal portion of the truss-iron—acts as a fulcrum upon which the axle tilts, in Fig. 4 being a fixed and in Fig. 5 a moving fulcrum.

Secured to the reach, as usual to the rear of the head-block, are the front ends of the hounds $g$, the opposite ends of which spread, so as to join with the rear axle, B, near the ends thereof and immediately underlying the rear springs, $h$, which rest upon spring-blocks $i$, to which they are firmly bound by clips $j$, encompassing the said axle. The blocks in turn rest upon the hound coupling-iron k, (shown in detail in Fig. 10,) which latter is secured to the hounds by means of bolts l, and lie across the top of the axle with downwardly-projecting lips m on each side of the axle to prevent a lateral movement thereon, in which they are assisted by the bolt n engaging the projecting end thereof and the hound-iron o extending along the under side of the hound.

A dowel-pin, p, is cast upon the upper face of said coupling-iron, projecting into the spring-block, for preventing said block from shifting upon its seat, the springs, block, and coupling-iron, hounds, and axle being rigidly united by means of the single clip j, hereinbefore mentioned.

So far as we are aware it is novel to have the hounds united to the axle at a point underlying the springs, regardless of the particular form of devices employed for joining the same together, and we therefore desire to claim this feature broadly.

Having described our invention, what we claim, and desire to secure by Letters Patent, is—

1. In a vehicle running-gear, the head-block, the upper part of the fifth-wheel secured thereto, and the fixed stirrup, in combination with the axle, a pivot-connection between said axle and block, the lower part of the fifth-wheel secured to said axle, and a spring confined between said lower part of the fifth-wheel and the fixed stirrup, substantially as described.

2. In a vehicle running gear, the head-block provided with a socket, the upper part of the fifth-wheel secured thereto, and the fixed stirrup, in combination with the axle, the lower part of the fifth-wheel secured thereto, a king-bolt secured to said axle, working through said stirrup and projecting loosely into the socket in the head-block, and a coil-spring sleeved on said bolt and confined between said stirrup and the lower part of the fifth-wheel, substantially as described.

3. In a vehicle running gear, the head-block, the upper part of the fifth-wheel secured thereto, and the fixed stirrup, in combination with the axle, the angular truss-iron secured thereto, the lower part of the fifth-wheel mounted on said iron, a pivot-connection between the axle and head block, and a spring confined between said stirrup and the lower part of the fifth-wheel, substantially as described.

4. In a vehicle running-gear, the head-block, the upper part of the fifth-wheel secured thereto, and the fixed stirrup, in combination with the axle provided with shoulders near the ends thereof, the angular truss-iron supported upon and secured to said axle, the ends of which bear against the shoulders on the axle, the lower part of the fifth-wheel mounted on said iron, a pivot-connection between the axle and head-block, and a spring confined between said stirrups and the lower part of the fifth-wheel, substantially as described.

5. In a vehicle running-gear, the head-block provided with a socket, the upper part of the fifth-wheel secured thereto, and the fixed stirrups, in combination with the axle provided with shoulders near the ends thereof, the angular truss-iron supported upon and secured to said axle, the ends of which bear against said shoulders on the axle, the lower part of the fifth-wheel mounted on said iron, a king-bolt also secured to the axle, working through the stirrup and projecting loosely into the socket in the head-block, and a coil-spring sleeved on said bolt and confined between said stirrup and the lower part of the fifth-wheel, substantially as described.

6. In a vehicle running-gear, the axle A, shoulders near the ends thereof, angular truss-iron L, secured to said axle with its ends abutting against said shoulders, and the horizontal portion M thereof, in combination with the brace R, king-bolt S, and upper part, H, of the fifth-wheel, stirrup a, and spring f, sleeved on said bolt, substantially as described.

7. In a vehicle running-gear, the axle, and the hound, in combination with a hound-coupling for joining said axle and hound, having depending lugs on each side of the axle, substantially as described.

8. In a running-gear, the axle B, hound g, springs h, hound-coupling K, bolts l n, and clip j, substantially as described.

9. In a running-gear, the axle B, hound g, springs h, hound-coupling K, spring-block i, pin p, bolts l n, lugs m m, and clip j, substantially as described.

10. In a vehicle running-gear, the axle, the truss-iron, and lugs or ears on said iron on each side of the axle, in combination with a clip encompassing the axle, the bolts of which engage said ears, substantially as described.

11. In a vehicle running-gear, the axle provided with shoulders near the ends thereof, and the truss-irons, the ends of which bear against the ends of said shoulders, in combination with a draw-clip embracing the axle and secured to said iron, said clip being provided with lugs or ears for the attachment of a thill, substantially as described.

FRANK KOPPLIN.
PATRICK BRENNAN.

Witnesses:
WILL R. OMOHUNDRO,
W. W. ELLIOTT.